United States Patent
Griffith et al.

(10) Patent No.: US 12,069,412 B2
(45) Date of Patent: Aug. 20, 2024

(54) TOY-SHAPED WIRELESS BABY MONITOR

(71) Applicants: Sadie Griffith, Laurel, MT (US); Craig Griffith, Laurel, MT (US)

(72) Inventors: Sadie Griffith, Laurel, MT (US); Craig Griffith, Laurel, MT (US)

(*) Notice: Subject to any disclaimer, the term of this patent is extended or adjusted under 35 U.S.C. 154(b) by 49 days.

(21) Appl. No.: 17/570,499

(22) Filed: Jan. 7, 2022

(65) Prior Publication Data

US 2023/0102445 A1    Mar. 30, 2023

Related U.S. Application Data

(60) Provisional application No. 63/249,321, filed on Sep. 28, 2021.

(51) Int. Cl.
| | | |
|---|---|---|
| *H04N 7/18* | (2006.01) | |
| *G06F 3/16* | (2006.01) | |
| *G06T 7/20* | (2017.01) | |
| *G10K 11/178* | (2006.01) | |
| *H04N 23/54* | (2023.01) | |
| *H04R 1/02* | (2006.01) | |
| *H04R 1/32* | (2006.01) | |

(52) U.S. Cl.
CPC .............. *H04N 7/183* (2013.01); *G06F 3/165* (2013.01); *G06T 7/20* (2013.01); *G10K 11/17853* (2018.01); *H04N 23/54* (2023.01); *H04R 1/028* (2013.01); *H04R 1/326* (2013.01); *G10K 2210/108* (2013.01); *G10K 2210/3011* (2013.01); *G10K 2210/3028* (2013.01)

(58) Field of Classification Search
CPC .. H04N 7/183; H04N 23/54; G10K 11/17853; G10K 2210/108; G10K 2210/3011; G06F 3/165; G06T 7/20; H04R 1/028; H04R 1/326
USPC ............................................ 348/151
See application file for complete search history.

(56) References Cited

U.S. PATENT DOCUMENTS

| | | | |
|---|---|---|---|
| 9,215,358 B2 * | 12/2015 | Sablak | H04N 23/61 |
| 2015/0105608 A1 * | 4/2015 | Lipoma | A61B 5/1115 |
| | | | 600/27 |
| 2015/0288877 A1 * | 10/2015 | Glazer | H04N 5/33 |
| | | | 348/77 |
| 2018/0020853 A1 * | 1/2018 | Gonzalez | A47G 19/2272 |
| | | | 366/142 |
| 2019/0130720 A1 * | 5/2019 | Lui | G06V 10/82 |

(Continued)

FOREIGN PATENT DOCUMENTS

WO   WO-2021102158 A1 *   5/2021   ......... G08B 21/0208

*Primary Examiner* — James E Springer
(74) *Attorney, Agent, or Firm* — Brennan, Manna & Diamond, LLC

(57) ABSTRACT

The present invention relates to a novel animal-shaped wireless baby monitor device. The device is configured to capture video and audio of a baby being monitored and to transmit same to a remote electronic transceiver device. The monitor device includes a pair of flexible ears that can be folded to clamp the device onto a surface such as a crib bar. The device further includes a pair of clamping slots on the rear surface for receiving a clamp for clamping the device to a surface. The device communicates with a device-monitoring software application installed in the electronic device and receive configuration and communication requests from the application. The device can be a part of an Internet of Things (IoT) network.

18 Claims, 9 Drawing Sheets

(56) References Cited

U.S. PATENT DOCUMENTS

2020/0111339 A1* 4/2020 Holt .................. G08B 21/0476
2020/0186756 A1* 6/2020 Veneziano ........... H04N 23/661

* cited by examiner

TOY-SHAPED WIRELESS BABY MONITOR

CROSS-REFERENCE TO RELATED APPLICATION

The present application claims priority to, and the benefit of, U.S. Provisional Application No. 63/249,321, which was filed on Sep. 28, 2021 and is incorporated herein by reference in its entirety.

FIELD OF THE INVENTION

The present invention relates generally to the field of baby monitor devices. More specifically, the present invention relates to a wireless baby monitor that is in the form of an animal, for example a kangaroo. The baby monitor is configured to wirelessly communicate with a remote electronic device or parent control unit for transmitting recorded (i.e. real-time) audio and video of the baby and surroundings. The monitor includes the capability of monitoring room temperature and motion, and emitting a flashing LED light. The remote user can view the recordings or real-time audio/video on a software application installed in the remote electronic device. The baby monitor can be clamped onto any surface such as a crib bar, a shelf and more using flexible ears and/or a clamp. Accordingly, the present disclosure makes specific reference thereto. Nonetheless, it is to be appreciated that aspects of the present invention are also equally applicable to other like applications, devices and methods of manufacture.

BACKGROUND

By way of background, baby monitors are commonly used to watch over babies. By looking at the monitor, parents and caretakers can check their baby's status and condition. The conventional baby monitors, heretofore known, can only be used in specific areas which lack flexibility and prohibit use when parents and caretakers are outside. Parents, while outside, cannot view or listen to real-time video and audio of the baby, which is not only discomforting but is troublesome for parents.

Conventional baby monitors are boring in appearance and may not interest babies. Individuals need baby monitors that are not only effective, but are specifically designed for children.

Conventional baby monitors are generally placed on a surface or are permanently mounted to a surface. Changing their position is not only time-consuming but can lead to physical damage to the baby monitor.

Therefore, there exists a long felt need in the art for an improved baby monitor device that can be easily clamped or mounted to any surface. There is also a long felt need in the art for a baby monitoring system that enables parents to remotely monitor their baby. Additionally, there is a long felt need in the art for a baby monitor that is aesthetically pleasing and appealing to babies. Moreover, there is a long felt need in the art for an improved baby monitor device that is in the shape of an animal (i.e. stuffed toy animal). Furthermore, there is a long felt need in the art for a baby monitor device that is lightweight, portable, and can be easily carried. Finally, there is a long felt need in the art for an improved baby monitor device and system that offers a way for remotely looking in on children, talking to them, playing white noise, playing background/nature sounds, playing music, and more.

The subject matter disclosed and claimed herein, in one embodiment thereof, comprises an animal-shaped wireless baby monitor that is configured in the shape of an animal (i.e. stuffed toy animal) such as a kangaroo. The kangaroo-shaped baby monitor comprises a pair of flexible ears that are foldable, along a folding line for mounting the baby monitor to a crib bar. The baby monitor features a wireless camera that can be disposed on the nose of the toy for capturing video in the field of view of the camera, a microphone for capturing audio around the baby monitor, a wireless module for establishing a wireless channel with a remote electronic device, a rechargeable battery, an LED light for indicating that the monitor is ready to use, a wireless charging surface disposed at the bottom of the toy for wirelessly charging the battery, a USB port for recharging the battery using a USB cable, a speaker for playing out audio, a room temperature detector for detecting room temperature, and a motion detector for detecting motion near the baby monitor. The baby monitor further includes a pair of clamping slots on the rear surface for receiving a clamp or clip for clamping onto any surface such as a shelf.

In this manner, the toy-shaped wireless baby monitoring device of the present invention accomplishes all of the forgoing objectives and provides users with a baby monitor that can be coupled with a handheld electronic device to transmit captured video, audio, motion information, room temperature, and more. The remote user can easily and conveniently view the baby and control the baby monitor device. Further, the baby monitor is in the form of an animal toy and can take the form of any animal.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an animal-shaped wireless baby monitor. The baby monitor is uniquely configured in the shape of an animal toy. The baby monitor further comprising a pair of flexible ears wherein the ears are foldable along a folding line for mounting the baby monitor to a surface, a wireless camera disposed on a nose of the toy for capturing video in the field of view of the camera, a microphone for capturing audio around the baby monitor, a wireless module for establishing a wireless channel with a remote electronic device, a rechargeable battery, an LED light for indicating that the monitor is ready to use, a wireless charging surface disposed at the bottom of the toy for wirelessly charging the battery, a USB port for recharging the battery using a USB cable (e.g., a USB-C cable, micro-USB cable, etc.), a speaker for playing out audio, a room temperature detector for detecting room or ambient temperature, and a motion detector for detecting motion near the baby monitor. The baby monitor further includes a pair of clamping slots on the rear surface for receiving a clamp or clip for clamping onto any surface such as a shelf.

The baby monitor is further configured to wirelessly transmit captured video and audio to the remote electronic device for viewing by a parent or caretaker through the established wireless channel.

In yet another embodiment, the wireless channel can be one or more from Bluetooth, Wi-Fi, any cellular network and Wi-Fi Direct.

In yet another embodiment, the wireless camera includes a low light cameral lens and includes a field of view of 180 degrees and can be rotated wirelessly by the remote electronic device.

In yet another embodiment, the microphone is a directional microphone and includes noise-cancellation properties.

The subject matter disclosed and claimed herein, in another embodiment thereof, comprises a wireless baby monitoring system. The wireless baby monitoring system includes a kangaroo-shaped wireless baby monitor communicatively-coupled to a computer-implemented application installed in a handheld electronic device. The kangaroo-shaped wireless baby monitor is configured to transmit captured video, audio, room temperature, motion information and battery level information to the coupled computer-implemented application. The computer-implemented application enables a user to zoom-in and zoom-out received video, rotate camera angle of the baby monitor based on detected motion information, initiate a live audio and video call with a child or baby being monitored by the baby monitor, and play white noise and background sounds/music to soothe the baby.

In yet another embodiment, the electronic device can be one or more of a transceiver, smartphone, tablet, smartwatch or a parent control unit.

In yet another embodiment, a wireless baby monitor associated with an Internet of Things (IoT) network is disclosed. The wireless baby monitor is configured to communicatively couple with an IoT hub through a wireless communication channel wherein the IoT hub transmits video, audio, room temperature, motion information and battery level information recorded by the baby monitor to a connected electronic device having an installed computer-implemented application. Further, the wireless baby monitor receives monitoring instructions from the computer-implemented application via the IoT hub.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed, and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
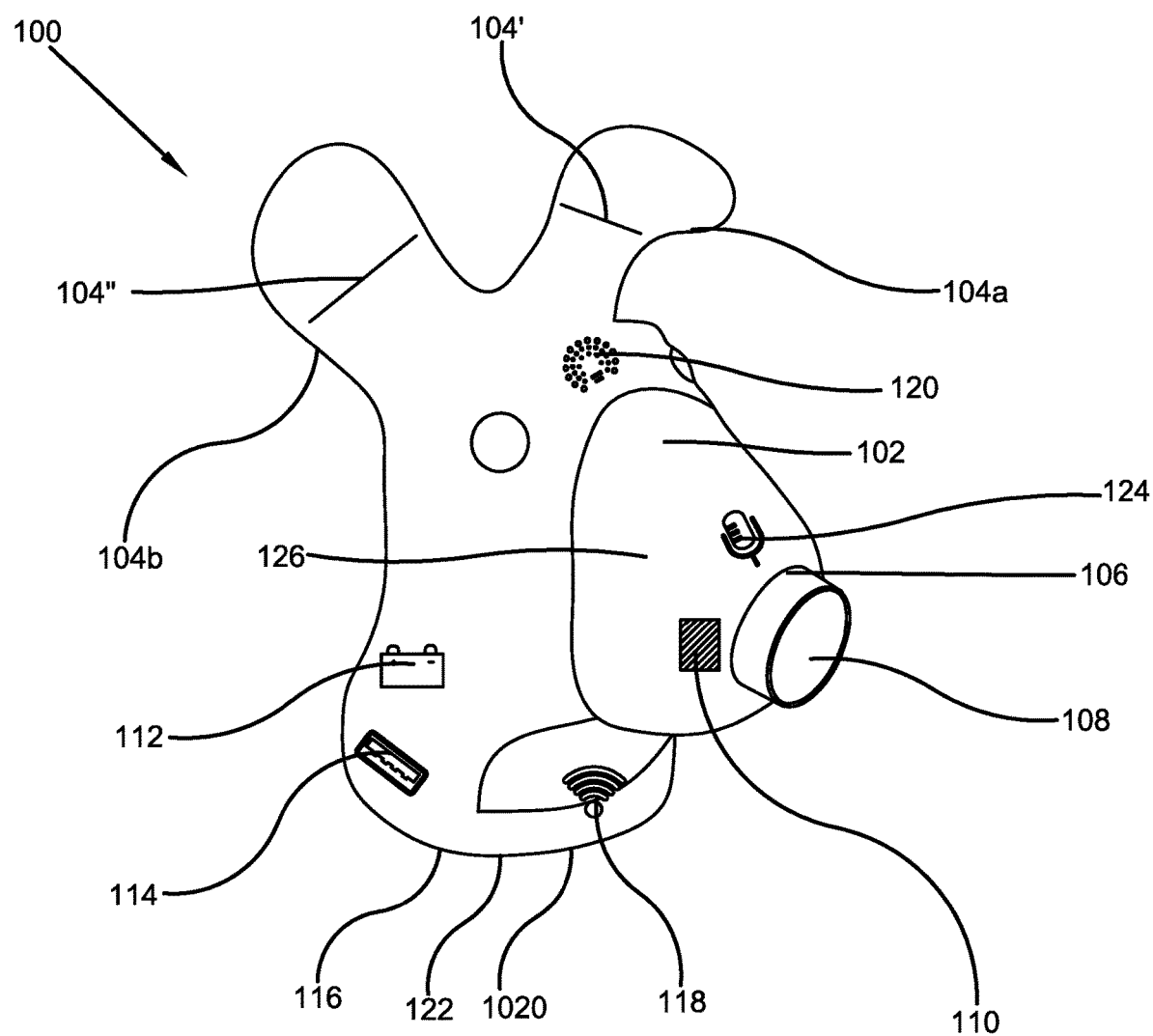
FIG. 1 illustrates a perspective view of one potential embodiment of a toy-shaped wireless baby monitor of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for an improved baby monitor device that can be easily clamped or mounted to any surface. There is also a long felt need in the art for a baby monitoring system that enables parents to remotely monitor their baby. Additionally, there is a long felt need in the art for a baby monitor that is aesthetically pleasing and interesting to babies. Moreover, there is a long felt need in the art for an improved baby monitor device that is in the shape of an animal (i.e. stuffed toy animal). Furthermore, there is a long felt need in the art for a baby monitor device that is lightweight, portable and can be easily carried. Finally, there is a long felt need in the art for an improved baby monitor device and system that offers a way for remotely looking in on children, talking to them, playing white noise, background sounds/music, and more.

The present invention, in one exemplary embodiment, is a novel wireless baby monitoring system. The wireless baby monitoring system includes a kangaroo-shaped wireless baby monitor communicatively-coupled to a computer-implemented application installed in a handheld electronic device. The kangaroo-shaped wireless baby monitor is configured to transmit captured video, audio, room temperature, motion information and battery level information to the coupled computer-implemented application. The computer-implemented application enables a user to zoom-in and zoom-out received video, rotate camera angle of the baby monitor based on detected motion information, initiate a live audio and video call with a baby or child being monitored by the baby monitor and play, for example, white noise, nature sounds, and/or music to soothe the baby.

Referring initially to the drawings, FIG. 1 illustrates a perspective view of one potential embodiment of the toy-shaped wireless baby monitor of the present invention in accordance with the disclosed architecture. FIG. 1 shows several advantageous features of the present invention, but as will be described below, the invention can be provided in several shapes, sizes, combinations of features and components, and varying numbers and functions of the components. The toy-shaped wireless baby monitor 100 can be designed in the shape of any animal and is shaped as a kangaroo head in one potential embodiment and can be available in various colors and styles. The kangaroo wireless baby monitor 100 is a multipurpose baby monitor that enables parents/caretakers to monitor their child remotely and enables them to communicate with the child/baby. The baby monitor 100 is a lightweight, compact and portable device that can be easily carried in a suitcase, purse or diaper bag. A plurality of electronic components is disposed within the kangaroo enabling a comprehensive monitoring of a baby lying in the vicinity of the monitor 100.

Figure 4:
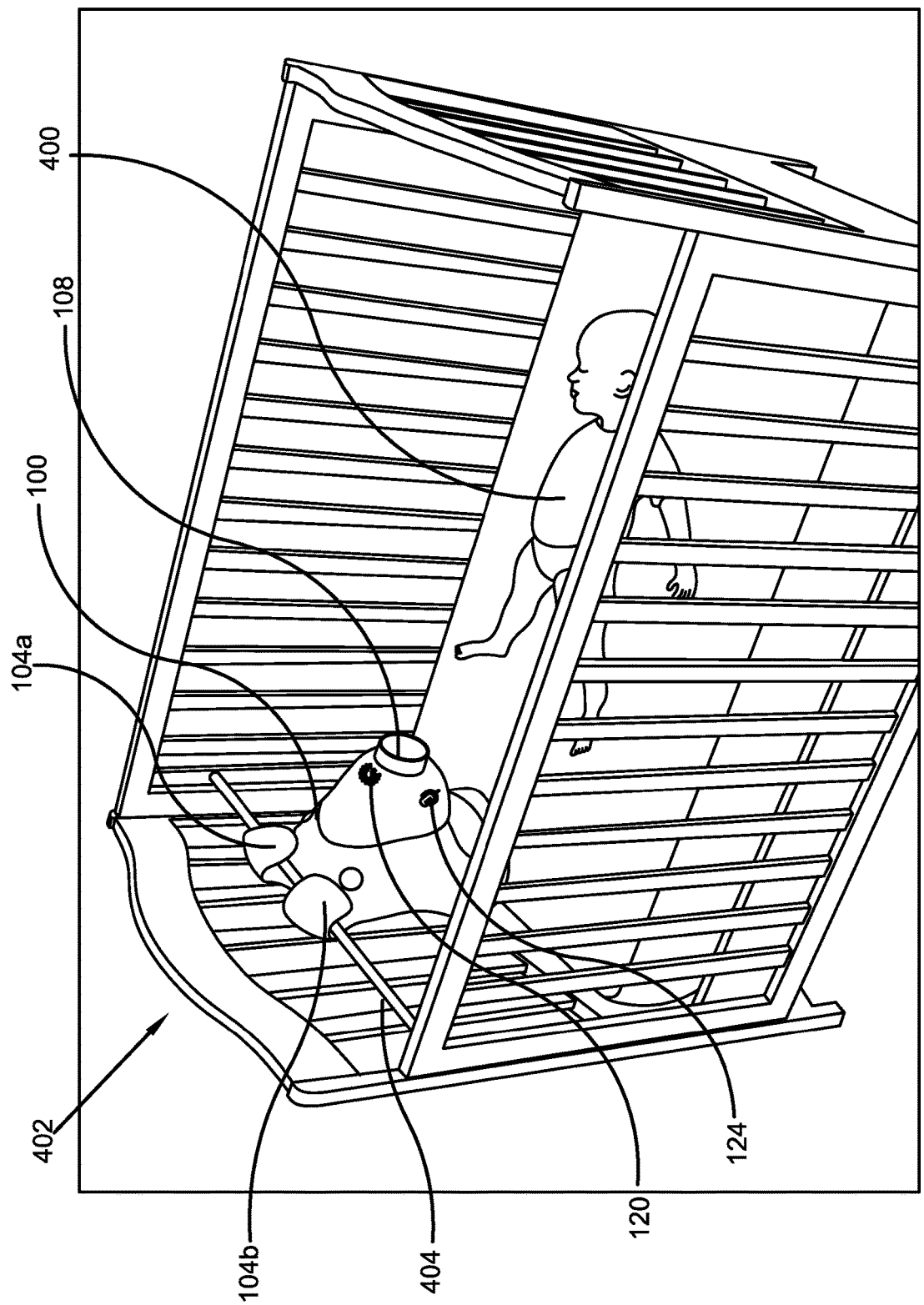
FIG. 4 illustrates a perspective view showing the baby monitor of the present invention mounted to a crib for monitoring a child in accordance with the disclosed architecture.

More particularly, the baby monitor 100 includes an outer layer 102 that provides a covering and protection to internal stuffing and electronic components disposed within the kangaroo 100. The outer layer 102 can be made from BPA and phthalate-free plastic. The plastic outer layer 102 can be splash-proof and prohibitive to breaking. A pair of flexible ears 104a,104b imitate the ears of a kangaroo. Each flexible ear 104a,104b includes a folding line that enables the ear to fold to mount to a crib rail, spindle or slat. As shown, the left ear 104a includes a folding line 104' and the right ear 104b includes the folding line 104". The flexible ears 104a,104b are used for securing the baby monitor 100 to a surface such as a crib, as best shown in FIG. 4.

Figure 5:
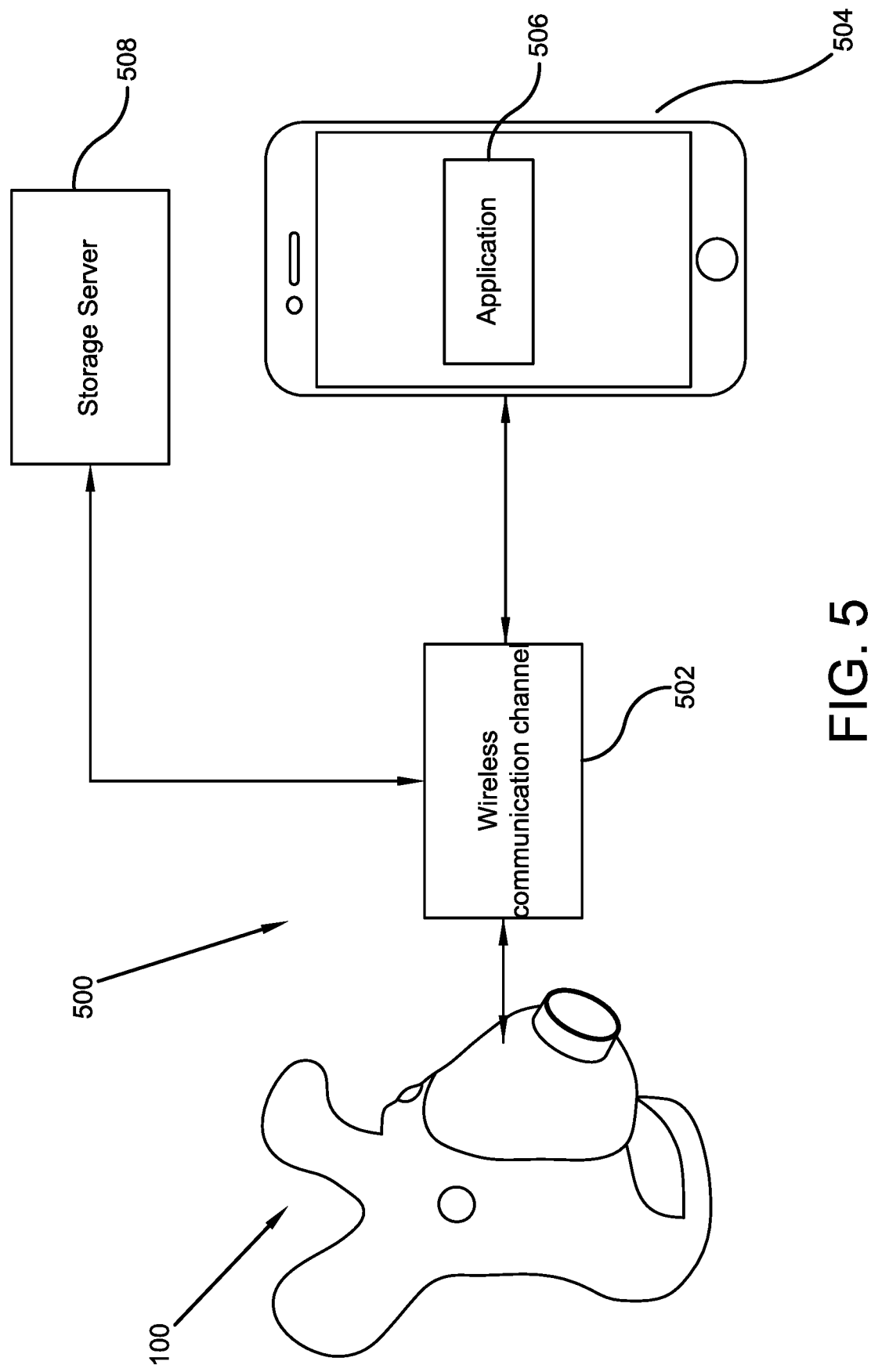
FIG. 5 illustrates a schematic view of wireless communication between the wireless baby monitor and a computer-implemented software application installed in a handheld electronic device in accordance with the disclosed architecture.

The nose 106 includes a wireless camera 108 configured for capturing audio and video in the field of view (FoV) of the camera 108 and transmitting same to a paired transceiver or smartphone application for review by a caretaker/parent. The wireless camera 108 includes a wide FoV and low light camera lens for capturing broad area and nighttime images. The wireless camera 108 can further include 180-degrees FoV. The camera 108 includes a low-light filter that enables clear view even in low-light. A speaker 110 can be integrated and disposed near the nose 106 that enables playing out any sound being remotely spoken by the parent or caretaker remotely, using the smartphone application as best shown in FIG. 5. The speaker 110 can also be configured to play out white noise, nature sounds, and/or music for relaxing and soothing sounds to be heard by the child being monitored by the baby monitor 100.

The baby monitor 100 includes an integrated battery 112 disposed within the kangaroo 100 that can be recharged using a USB cable (not shown) coupled to the USB charging port 114. The battery 112 can also be recharged using a wireless charger 116 placed at the bottom surface of the kangaroo 100. The battery 112 can be a Li-Ion battery or a Nickel battery. Further, the battery 112 can be in the form of a button battery. The preferred batteries used in the monitor 100 are AA or AAA batteries and can be accessed using a battery cover (not shown). The battery 112 can be used for providing power to various electronic components, such as, a speaker 110, camera 108, LED light 120 and many more, and can be configured to provide power for more than twenty-four hours continuously, thereby enabling the baby monitor 100 to perform effective monitoring of the child.

For wireless communication with one or more paired handheld electronic devices such as transceivers and smartphones, the baby monitor 100 includes a wireless communication module 118, configured to provide a wireless communication channel for communication with the electronic devices as best shown in FIG. 5. It should be noted that the wireless communication module 118 can be disposed within the outer layer 102 or can be present on the outer layer 102 as per the design parameters of the device 100. An LED light 120 is placed near the ears 104a,104b and can flash indicating the baby monitor 100 is active and can be connected to a handheld electronic device using the wireless communication channel.

At the bottom surface 1020, a push button (i.e. locking power on/off switch) 122 can be positioned that can be pushed to manually activate and deactivate the monitor 100. For the monitor 100 to capture the sound of a child who is being monitored, a directional microphone 124 is positioned near the nose 106. The directional microphone 124 includes a noise cancellation filter that eliminates noise so that the voice of the child or toddler can be clearly captured.

A motion detector 126 is integrated to the monitor 100 and is configured to detect motion in the field of view of the camera and also in the range of up to ten feet from the monitor 100. When a motion is detected by the detector 126, a notification is transmitted to the remote electronic device. Further, when the monitor is disconnected, or runs out of power, an alarm can be sent to the remote electronic device.

Figure 2:
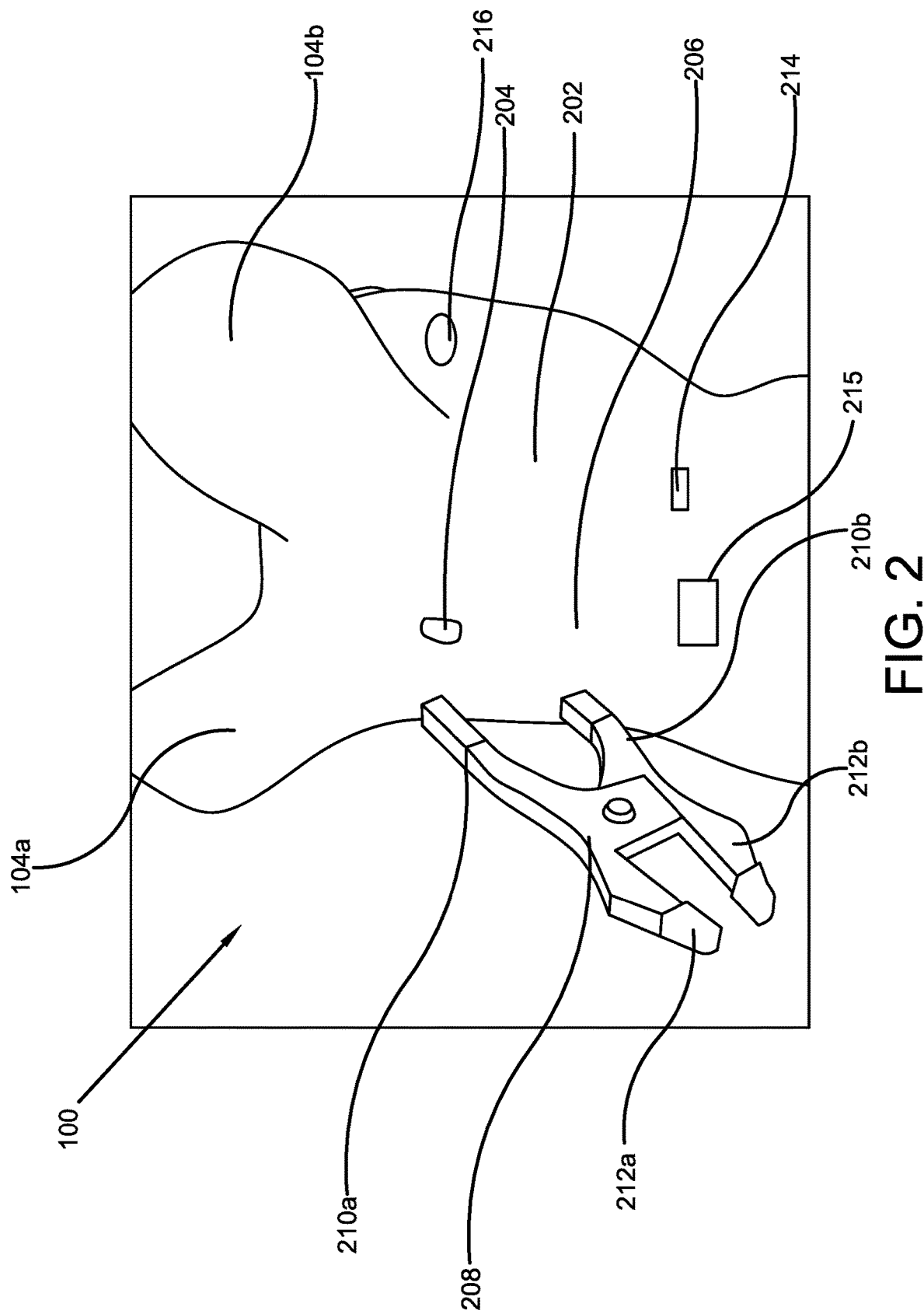
FIG. 2 illustrates a rear perspective view of the portable wireless baby monitor of the present invention in accordance with the disclosed architecture.
Figure 8:
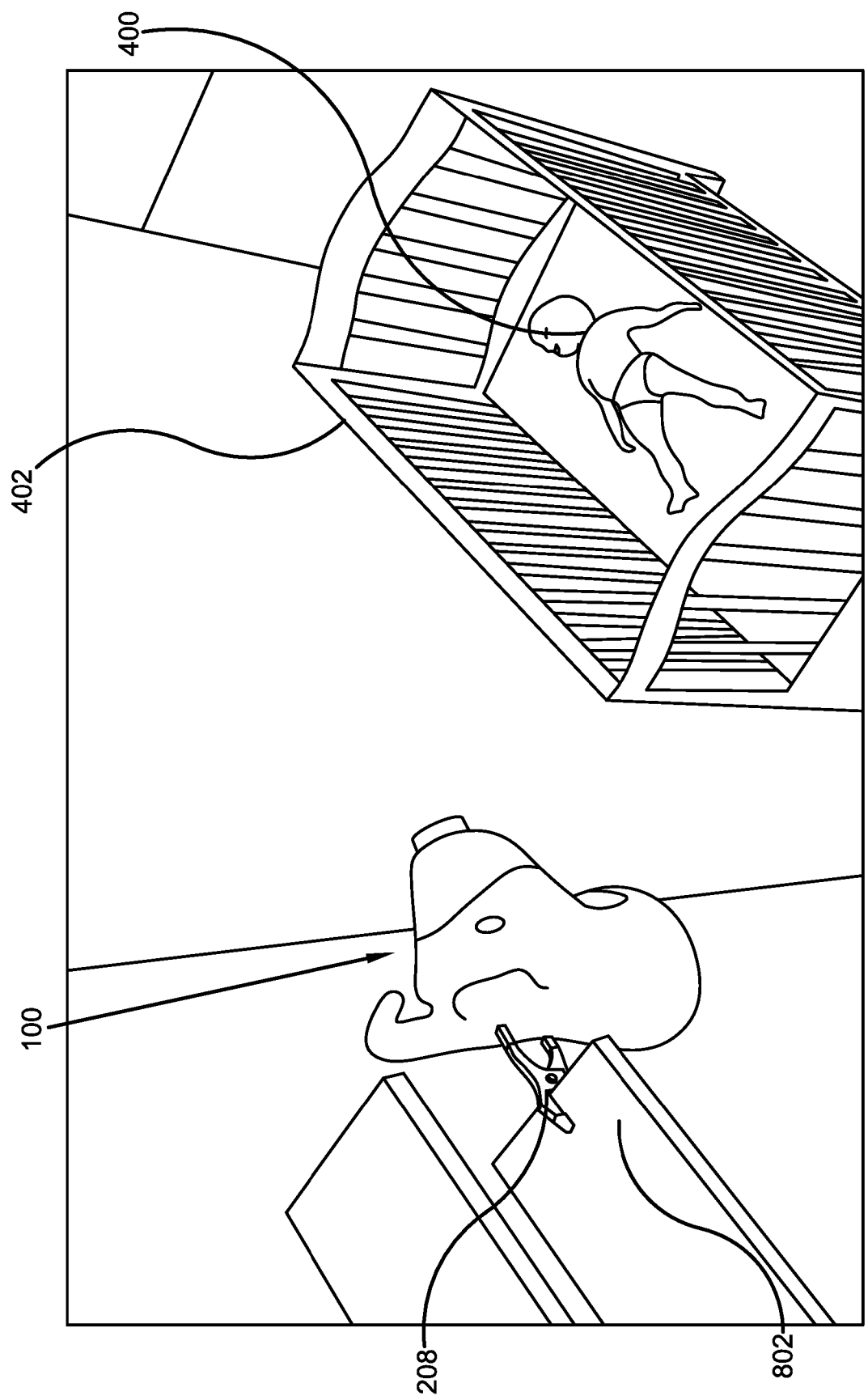
FIG. 8 illustrates a perspective view showing the portable kangaroo-shaped baby monitor being clamped onto a shelf for monitoring the baby in accordance with the disclosed architecture.

FIG. 2 illustrates a rear perspective of the portable wireless baby monitor 100 of the present invention in accordance with the disclosed architecture. As stated earlier, an advantage of the baby monitor 100 of the present invention is that it can be mounted to any shelf or surface and can be attached to a crib or bed of the child. This increases flexibility of the use of the baby monitor 100. For mounting the monitor 100 to any surface like a shelf, a pair of slots 204, 206 are positioned vertically above one another on the rear surface 202. The slots 204, 206 are configured to receive clamping arms of a clamp 208 and the clamp 208 can be used for mounting the baby monitor 100. As shown, the upper slot 204 receives a first clamping arm 210a and the lower slot 206 receives a second clamping arm 210b. The slots 204, 206 receive and secure the clamping arms 210a, 210b, securely enabling the monitor 100 to be positioned as per the desire of the users. Further, for clipping to a surface, the first handle arm 212a and the second handle arm 212b are placed around the surface and are secured to mount the monitor 100 as shown in FIG. 8. The rear surface 202 also includes a room temperature monitor or thermometer 214, and a room humidity monitor or hygrometer 215, positioned thereon that continuously measures the room temperature and humidity, respectively, and provides same to the remote user when requested. A sleep detector 216 detects duration for which the baby is sleeping and can be used in conjunction with the motion detector 126. This is useful to notify and ascertain sleeping patterns of the baby.

Figure 3:
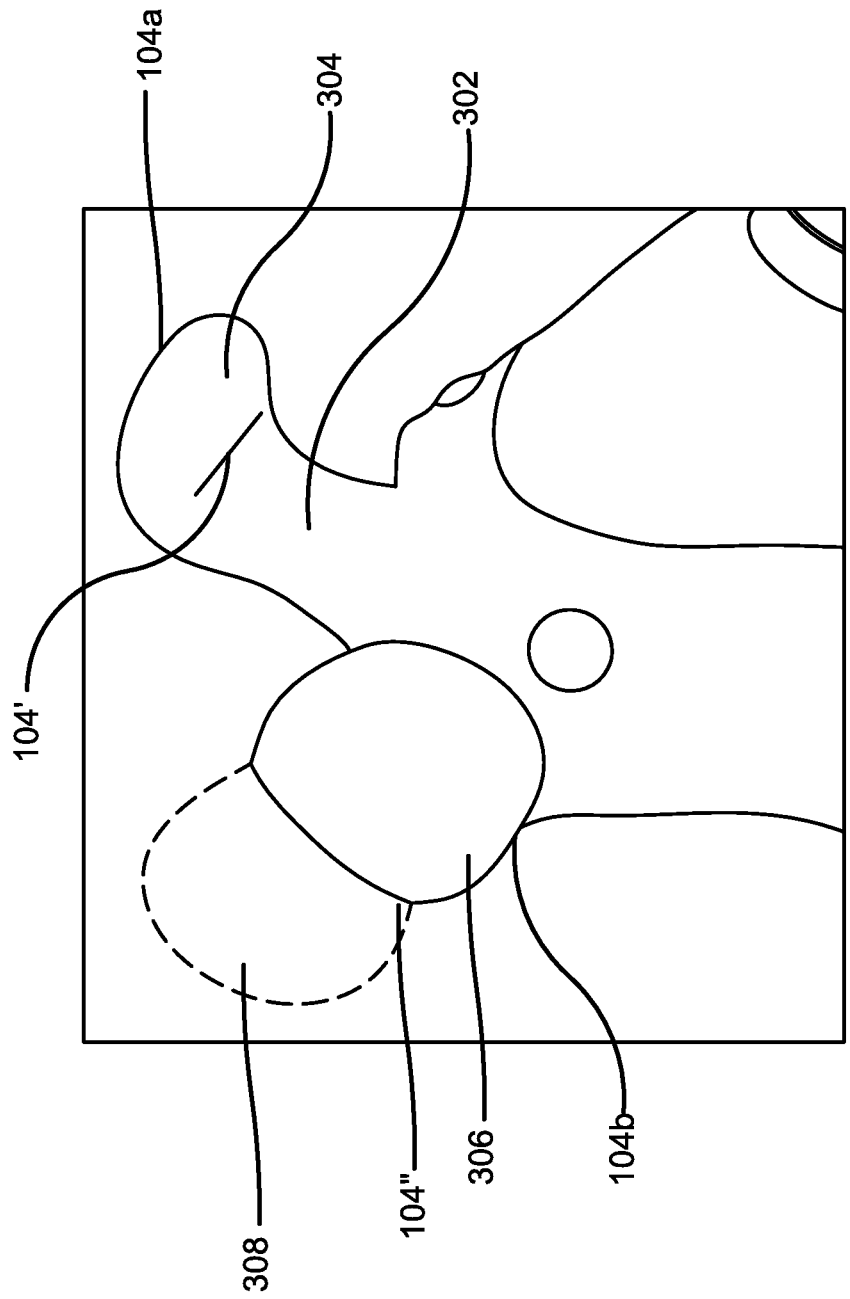
FIG. 3 illustrates an enlarged view of the flexible ears showing how the ears are folded to mount the monitor to a crib or any longitudinal bar in accordance with the disclosed architecture.

FIG. 3 illustrates an enlarged view of the flexible ears 104a,104b showing how the ears are folded to mount the monitor 100 to a crib or any longitudinal bar in accordance with the disclosed architecture. The left flexible ear 104a includes a lower portion 302 and an upper portion 304 separated by the fold line 104'. The upper portion 304 is defined as the part of the ear 104a positioned above the fold line 104' and the lower portion 302 is positioned below the fold line 104'. For attaching the monitor 100 to the crib, the upper portion 304 is folded along the folding line 104' to create a groove between the upper portion 304 and the lower portion 302. Similarly, the right ear 104b includes a lower portion 306 and an upper portion 308, separated by the fold line 104". The upper portion 308 is defined as the part of the ear 104b positioned above the fold line 104" and the lower portion 306 is positioned below the fold line 104". The upper portion 308 is folded along the folding line 104" to create a groove between the upper portion 308 and the lower portion 306.

FIG. 4 illustrates a perspective view showing the baby monitor 100 of the present invention mounted to a crib 402 for monitoring a child 400 in accordance with the disclosed architecture. As shown, the child 400 is sleeping in the crib 402 and is being monitored by the baby monitor 100. The monitor 100 is mounted to the crib 402 by folding the flexible ears 104a,104b as described in FIG. 3. The flexible ears 104a,104b are secured to the crib bar 404 such that the wireless camera 108 is positioned towards the baby or child 400 retained within the crib 402. This enables effective monitoring of the child 400 and also enables a remote parent/caretaker to talk to the child 400 though use of the speaker and microphone. It should be noted that not all the components of the monitor 100 are shown in FIG. 3 for brevity and clarity.

FIG. 5 illustrates a schematic view of a wireless communication between the wireless baby monitor 100 and a computer-implemented software application installed in a handheld electronic device in accordance with the disclosed architecture. An advantage of the wireless baby monitoring system 500 is that the wireless baby monitor can be wirelessly operated and also transmit recorded video and audio to the remote handheld device such as a transceiver, a smartphone, a smartwatch or a remote control 504. A wireless channel 502 can be used for communication between the monitor 100 and the application 506. The baby monitor 100 can be configured in the software application 506 that enables a user such as a parent or caretaker to remotely monitor the child. The wireless communication channel 502 may be of any local area network (LAN), metropolitan area network (MAN), wide area network (WAN), a public data network (e.g., the Internet), short range wireless network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), Zigbee, Wi-Fi Direct, wireless LAN (WLAN), Bluetooth®, mobile ad-hoc network (MANET) and the like, or any combination thereof. Wi-Fi enables the electronic device 504 to remotely control and operate the monitor 100. Remote control is useful for parents who are not at home and want to monitor the child in the field of view of the camera of the monitor 100.

Primarily, the software application 506 converts the display of the electronic device 504 into a video and audio monitor. The software application 506 is configured to receive and display real-time video and audio from the monitor 100. Further, the direction of the camera of the monitor 100 can be changed using the software application 506. A voice command or communication can also be transmitted from the software application 506 to monitor 100 enabling the user to communicate with the child. It should be noted that all the communication between the monitor 100 and the software application 506 is end-to-end encrypted and secure. Any conventional encryption technique such as SSL, Advanced Encryption Standard (AES), or any other can be used for communication. The communication is encoded and the encryption keys necessary for decoding the communication are exchanged during configuration of the smartphone application 506 for the monitor 100. This prevents any unauthorized access to the video, audio and any other data captured by the monitor 100.

The software application 506 can be configured to connect to one or more monitors 100 enabling the remote user to monitor multiple areas or rooms of the home. The encryption enables users to connect to only authorized cameras. In addition to the smartphone or electronic device 504, the captured data is also communicated to a storage server 508 for centralized data storage. The storage server 508 securely stores the data received from the monitor 100 in an encrypted form and can be retrieved using the software application 506 whenever required. The storage space on the server 508 can be purchased by the user and the storage 508 can be centralized, distributed, cloud accessed or any other type of server.

The software application 506 provides a plurality of control options to view and monitor the view and sound captured by the baby monitor 100. The application 506 can be updated periodically to include new features and can be downloaded using the Internet. The monitor application 506 also provides notifications when the baby monitor 100 is losing connection or power.

Figure 6:
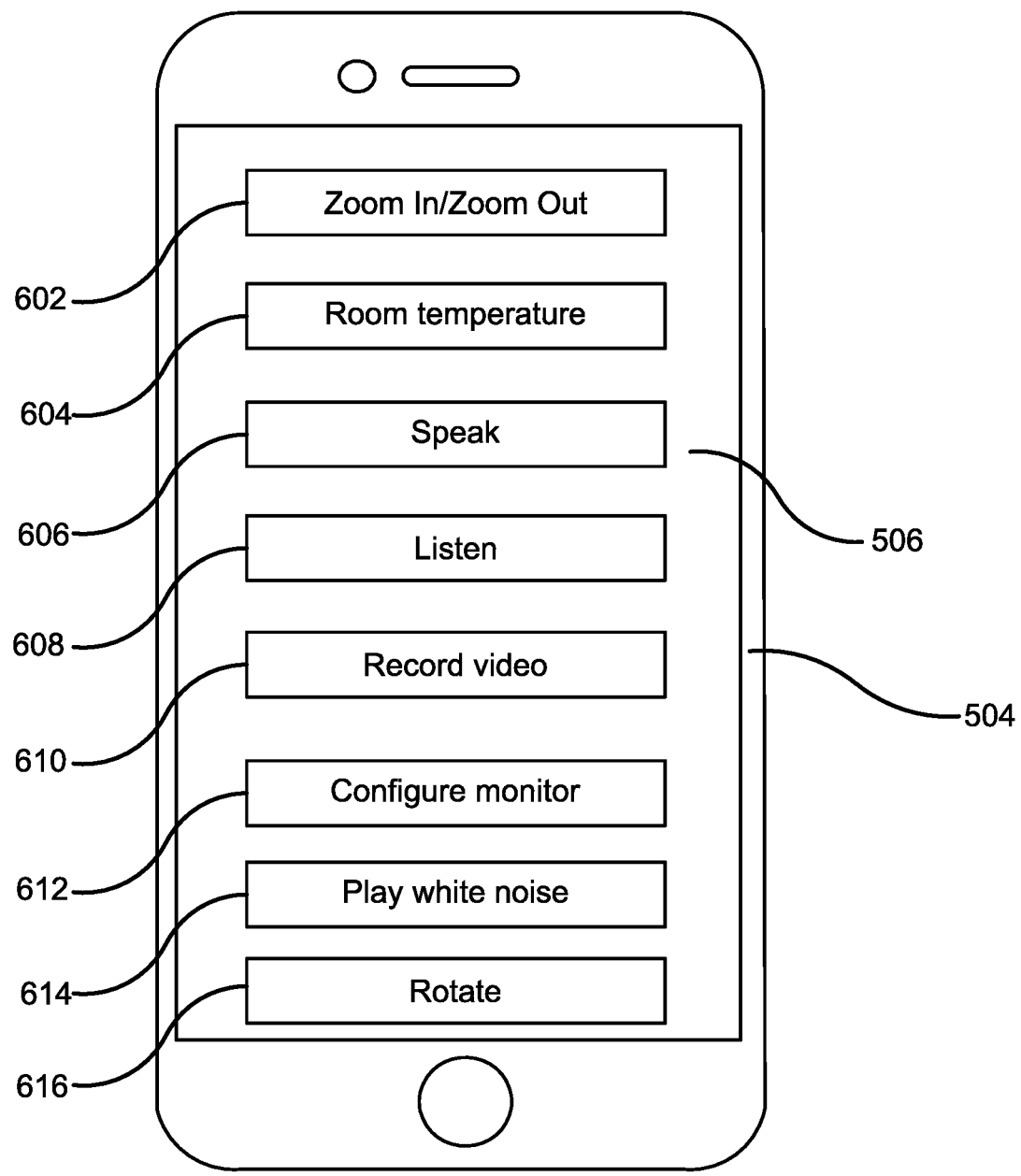
FIG. 6 illustrates exemplary features offered by the software application of the present invention for communication with the wireless baby monitor in accordance with the disclosed architecture.

FIG. 6 illustrates exemplary features offered by the software application 506 of the present invention for communication with the wireless baby monitor 100 in accordance with the disclosed architecture. As stated earlier, the baby monitor application 506 displays a real-time video and audio display for review by parents and caretakers. The application 506 enables a user to zoom-in or zoom-out the real-time or recorded video/image using the zoom-in/zoom-out control 602. A user can perform gestures such as placing the thumb and index fingertips together on display of the electronic device 504, and then slowly moving the thumb and finger apart for zooming in the video or image. Similarly, the thumb and a finger or two fingers are moved towards each other for zooming out of the video or image.

For receiving room temperature, the room temperature tab 604 can be accessed. The tab 604 can also be used to configure the room temperature detector for a threshold value. The threshold value can be set based on the requirement of the toddler or child being monitored by the baby monitor 100. When a remote user wants to contact the baby for video and/or audio communication, the speak tab 606 can be accessed. This enables the user to speak to the baby. Also, the tab 606 enables a live audio and video chat of the remote user and the baby where the speaker and microphone of the monitor device 100 (shown in FIG. 1) are used for enabling communication with the remote user. For listening to the sound of the baby, the user can use the listen tab 608.

In cases where the remote user detects any suspicious activity in the live video, the video can be recorded by using the record video tab 610. In one embodiment, recording of live video can be activated by default based on the preferences of users. For configuring new baby monitors, the baby monitor 100 can be connected to a smart home network and any other configuration, the user can use the configure monitor tab 612. The tab 612 can be used for configuring a plurality of monitor devices with the smartphone application 506. For soothing a child, the user can remotely enable the monitor device 100 to play white noise, nature sounds, and/or music using the play white noise tab 614.

The software application 506 also provides to the remote user the ability to rotate the direction of the camera of the baby monitor 100. This enables a different field of view and can capture a different area for monitoring. The rotation of the camera can be preferably done in the direction in which motion is detected by the motion detector 126.

Figure 7:
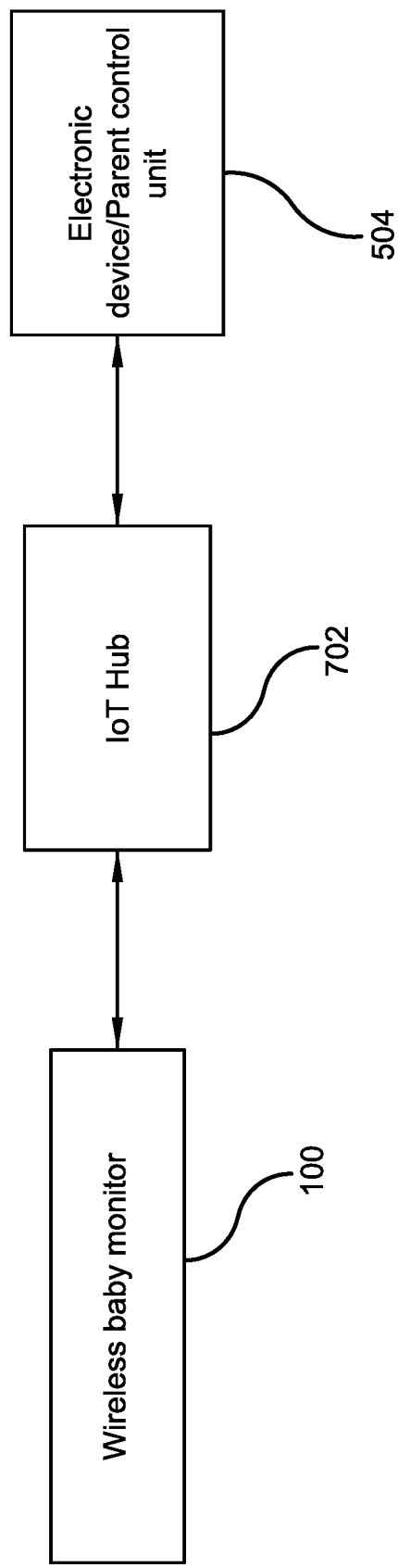
FIG. 7 illustrates another schematic view of the wireless baby monitor of the present invention in communication with an Internet of Things (IoT) hub in accordance with the disclosed architecture.

FIG. 7 illustrates another schematic view of the wireless baby monitor 100 of the present invention in communication with an Internet of Things (IoT) hub 702 in accordance with the disclosed architecture. An advantage of the wireless baby monitor 100 of the present invention is that it can be communicatively coupled with an IoT hub 702 for becoming a part of a smart home or IoT network. The monitor 100 can communicate with the IoT network using any local area network (LAN), metropolitan area network (MAN), wide area network (WAN), a public data network (e.g., the Internet), short range wireless network, or any other suitable packet-switched network, such as a commercially-owned, proprietary packet-switched network, e.g., a proprietary cable or fiber-optic network and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Bluetooth low energy (BLE), Zigbee, Internet Protocol (IP) data casting, satellite, mobile ad-hoc network (MANET) and the like, or any combination thereof.

The IoT hub 702 is further communicatively-coupled to the electronic device or a parent control unit 504. The electronic device 504 is configured to receive notification and real-time video from the IoT hub 702 to control and monitor the baby in a manner similar to that described in other embodiments of the present invention.

FIG. 8 illustrates a perspective view showing the portable kangaroo-shaped baby monitor 100 being clamped onto a shelf 802 for monitoring the baby 400 in accordance with the disclosed architecture. An advantage of the monitor 100 is that it can be mounted or clamped to any surface and need not be restricted to a single place. For clamping onto a surface such as the shelf 802, the clamp 208 is used for clamping the baby monitor 100 in a manner as described in FIG. 2. The clamping enables the monitor 100 to be placed at different locations as desired by parents and caretakers. As shown, when mounted on the shelf 802, the baby 400 sleeping in the crib 402 can be easily monitored by the monitor 100 without being preoccupied with the monitor 100.

Figure 9:
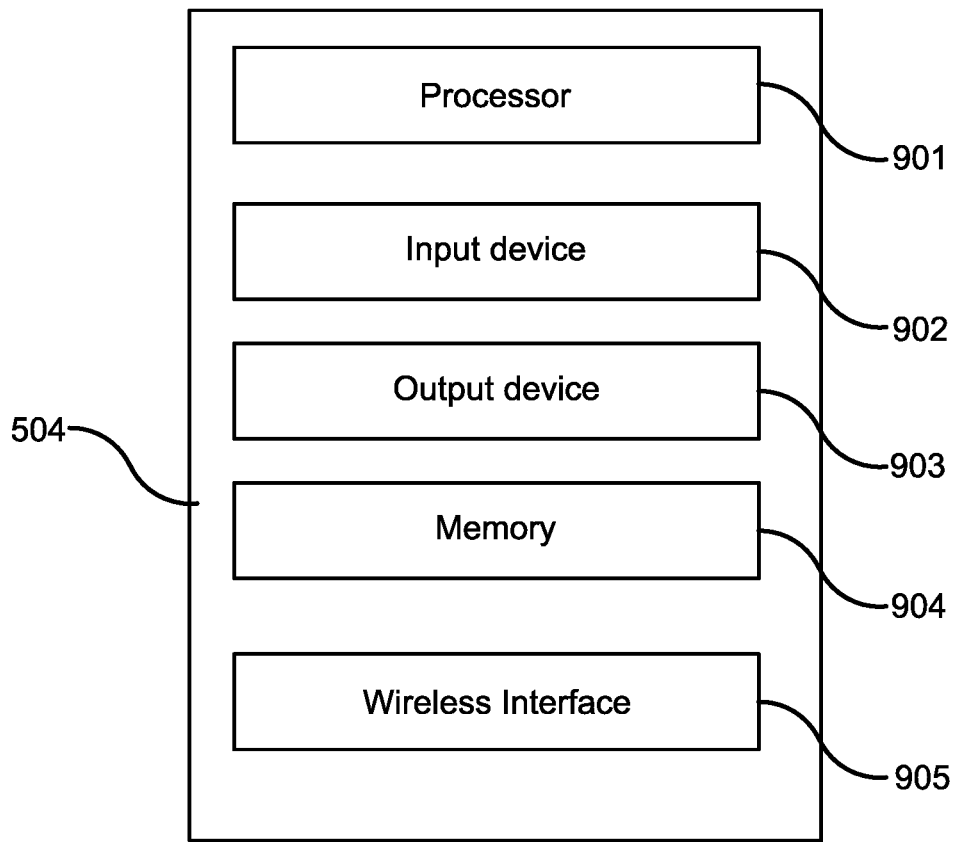
FIG. 9 illustrates an exemplary electronic device in which the monitoring application of the present disclosure is installed in accordance with the disclosed architecture.

FIG. 9 illustrates an exemplary electronic device 504 in which the monitoring application 506 of the present disclosure is installed in accordance with the disclosed architecture. The electronic device 504 includes several components such as a processor 901 configured to perform one or more functions described herein in accordance with the computer-implemented instructions. The electronic device 504 includes input device(s) 902 such as a mouse, keyboard, touch input device, voice input device, etc., for entering data and information. The electronic device 504 also includes one or more output device(s) 903 such as a monitor, presence-sensitive display, or other display device. Electronic device 504 includes memory 904 used for storing programs (sequences of instructions) or data (e.g., program state information) on a temporary or permanent basis for use in the computer system. Memory 904 can be configured for short-term storage of information as volatile memory, and therefore not retain stored contents if powered off. Examples of volatile memories include random access memories (RAM), dynamic random-access memories (DRAM), static random-access memories (SRAM) and other forms of volatile memories known in the art. The processor 901, in combination with one or more of memory 604, input device(s) 602, output device(s) 903 can be utilized to enable parents and caretakers to receive, zoom in and out, configure, and perform other functions for the baby monitor 100. The wireless connection with the baby monitor is provided by the wireless interface 905. It is to be appreciated that some components and functionality as described supra are present in the parent control unit.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "toy-shaped wireless baby monitor", "portable wireless baby monitor", "baby monitor", "wireless monitor", "kangaroo-shaped wireless baby monitor", "kangaroo-shaped baby monitor" and "monitor" are interchangeable and refer to the toy-shaped wireless baby monitor 100 of the present invention.

Notwithstanding the forgoing, the toy-shaped wireless baby monitor 100 of the present invention can be of any suitable size and configuration as is known in the art without affecting the overall concept of the invention, provided that it accomplishes the above-stated objectives. One of ordinary skill in the art will appreciate that the size, configuration and material of the toy-shaped wireless baby monitor 100 as shown in the FIGS. are for illustrative purposes only, and that many other sizes and shapes of the toy-shaped wireless baby monitor 100 are well within the scope of the present disclosure. Although the dimensions of the toy-shaped wireless baby monitor 100 are important design parameters for user convenience, the toy-shaped wireless baby monitor 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A toy-shaped wireless baby monitor for remotely monitoring and remotely communicating with a child, the toy-shaped wireless baby monitor comprising;
    a splash-proof BPA and phthalate-free plastic outer layer;
    a pair of flexible ears, each flexible ear comprising a fold line configured to fold over a crib rail;
    a wireless camera that captures video in a field of view of said wireless camera and transmits the video to a connected transceiver;
    a microphone that captures an ambient audio around said monitor and transmits the ambient audio to said connected transceiver.
    a speaker integrated with said connected transceiver for playing out a sound being remotely provided by a caretaker using said connected transceiver;
    a battery for portable operation, wherein said battery powers said camera, said microphone, and said speaker;
    a pair of flexible mounting elements, wherein said pair of flexible mounting elements is mountable to a crib rail; and
    a motion detector; and
    wherein the wireless camera is adapted to rotate in a direction in which motion up to ten feet away from the monitor is detected by the motion detector.

2. The toy-shaped wireless baby monitor of claim 1, wherein said sound comprises sound selected from a group consisting of a white noise, a nature sound, and music to relax and sooth the child being monitored.

3. The toy-shaped wireless baby monitor of claim 1, wherein said battery is rechargeable.

4. The toy-shaped wireless baby monitor of claim 1, wherein said microphone is a directional microphone and includes a noise cancellation filter.

5. The toy-shaped wireless baby monitor of claim 1 further comprising an LED indicator light for indicating when said toy-shaped wireless baby monitor is active.

6. The toy-shaped wireless baby monitor of claim 1, wherein said connected transceiver is a smartphone application.

7. The toy-shaped wireless baby monitor of claim 1, wherein said pair of flexible mounting elements comprise a pair of clamping arms for retention to said toy-shaped wireless baby monitor and a pair of handle arms for retention to the crib rail.

8. The toy-shaped wireless baby monitor of claim 1, further comprising a thermometer for measuring an ambient temperature relative to said toy-shaped wireless baby monitor; and
    a hygrometer for measuring an ambient humidity relative to said toy-shaped wireless baby monitor.

9. A toy-shaped wireless baby monitor for remotely monitoring and remotely communicating with a child, the toy-shaped wireless baby monitor comprising:
    a splash-proof BPA and phthalate-free plastic outer layer;
    a pair of flexible ears, each flexible ear comprising a fold line configured to fold over a crib rail;
    a wireless camera comprising a low light camera lens to capture a nighttime video in a field of view of said wireless camera and to transmit the nighttime video to a connected transceiver;
    a microphone that captures an ambient audio around said toy-shaped wireless baby monitor and transmits the ambient audio to said connected transceiver;
    a battery for portable operation, wherein said battery powers said camera and said microphone;
    a pair of flexible mounting elements, wherein said pair of flexible mounting elements is mountable to a crib rail; and
    a motion detector; and
    wherein the wireless camera is adapted to rotate in a direction in which motion up to ten feet away from the monitor is detected by the motion detector.

10. The toy-shaped wireless baby monitor of claim 9 further comprising a speaker integrated with said connected transceiver for playing out a sound being remotely provided by a caretaker using said connected transceiver.

11. The toy-shaped wireless baby monitor of claim 10, wherein said sound comprises a sound selected from a group consisting of a white noise, a nature sound, and music to relax and sooth the child being monitored by said toy-shaped wireless baby monitor.

12. The toy-shaped wireless baby monitor of claim 11, wherein said battery is rechargeable.

13. The toy-shaped wireless baby monitor of claim 12, wherein said microphone is a directional microphone and includes a noise cancellation filter.

14. The toy-shaped wireless baby monitor of claim 13 further comprising an LED indicator light.

15. The toy-shaped wireless baby monitor of claim 14, wherein said connected transceiver is a smartphone application.

16. The toy-shaped wireless baby monitor of claim 9, wherein said pair of flexible mounting elements include a pair of clamping arms for retention to said toy-shaped wireless baby monitor and a pair of handle arms for retention to the crib rail.

17. The toy-shaped wireless baby monitor of claim 9 further comprising a thermometer for measuring an ambient temperature relative to said toy-shaped wireless baby monitor.

18. A toy-shaped wireless baby monitor comprising:
    a BPA and phthalate-free plastic outer layer;
    a pair of flexible ears, each flexible ear comprising a fold line configured to fold over a crib rail;
    a wireless camera comprised of a low light camera lens to capture a nighttime video in a field of view of said wireless camera;
    a connected transceiver to receive the nighttime video captured by the wireless camera;
    a microphone that captures an ambient audio around said toy-shaped wireless baby monitor and transmits the ambient audio to said connected transceiver;
    a battery comprising a USB charging port that powers said wireless camera and said microphone;
    a thermometer that measures an ambient temperature;
    a flexible mounting element that is mountable to a crib rail; and
    a motion detector; and wherein the wireless camera is adapted to rotate in a direction in which motion up to ten feet away from the monitor is detected by the motion detector.

\* \* \* \* \*